United States Patent [19]

Kenue

[11] Patent Number: 4,970,653
[45] Date of Patent: Nov. 13, 1990

[54] VISION METHOD OF DETECTING LANE BOUNDARIES AND OBSTACLES

[75] Inventor: Surender K. Kenue, Southfield, Mich.

[73] Assignee: General Motors Corporation, Detroit, Mich.

[21] Appl. No.: 334,033

[22] Filed: Apr. 6, 1989

[51] Int. Cl.[5] ............................................. G06F 15/50
[52] U.S. Cl. ................................ 364/461; 364/424.02; 358/103
[58] Field of Search .............. 364/424.02, 461, 424.02; 180/167, 168, 169; 318/587, 103

[56] References Cited

U.S. PATENT DOCUMENTS

| | | | |
|---|---|---|---|
| 4,566,032 | 1/1986 | Hirooka et al. | 364/424.02 |
| 4,573,547 | 3/1986 | Yoshimura et al. | 180/168 |
| 4,819,169 | 4/1989 | Saitoh et al. | 364/424.02 |
| 4,847,774 | 7/1989 | Tomikawa et al. | 364/424.02 |
| 4,862,047 | 8/1989 | Suzuki et al. | 318/587 |
| 4,868,752 | 9/1989 | Fujii et al. | 364/424.02 |

OTHER PUBLICATIONS

Dickmanns, E. D. and Zapp, A., "A Curvature-Based Scheme for Improving Road Vehicle Guidance by Computer Vision," Proc. SPIE on Mobile Robots, vol. 727, Oct. 1986, pp. 161–168.

*Primary Examiner*—Gary Chin
*Attorney, Agent, or Firm*—Howard N. Conkey

[57] ABSTRACT

An image processing method operates on an image from a ccd camera viewing a roadway scene in front of a vehicle to detect lane markers and determine the relationship of the vehicle to the lane. Obstacles in the lane near the vehicle are detected and a warning is given to the driver. The method uses template matching techniques or a Hough algorithm to detect the lane markers or road edges.

10 Claims, 7 Drawing Sheets

STRAIGHT LINE IN
IMAGE DOMAIN

STRAIGHT LINE IN
HOUGH DOMAIN

VISION METHOD OF DETECTING LANE BOUNDARIES AND OBSTACLES

FIELD OF THE INVENTION

This invention relates to a vision method of detecting lane boundaries and obstacles close to a vehicle within the lane boundaries, and particularly to such a method employing image processing techniques and which is operative for moderately marked roads.

BACKGROUND OF THE INVENTION

The use of an on-board video camera and image processing of the roadway scenes allows useful information to be gathered for vehicle control. Detecting lane boundaries is a core capability for advanced automotive functions such as collision warning, collision avoidance and automatic vehicle guidance. If the lane boundaries and thus the road path can be detected several other functions can be implemented. Lane control uses the boundary information and vehicle dynamics knowledge to derive steering and braking commands for keeping the vehicle in the lane. Headway control uses a laser or radar system to track the vehicle ahead and keeps a safe driving distance. The lane boundary information can be used to prevent the detection of a vehicle in an adjacent lane on a curved road. Then the sensor beam can be directed to points within the lane. To monitor driving performance, the behavior of the driver is tracked and evaluated using the estimated position of the vehicle with respect to the lane boundaries.

Lane boundary detection for guiding vehicles along roadways has been reported in the paper by Dickmanns, E. D. and Zapp, A , "A Curvature-based Scheme for Improving Road Vehicle Guidance by Computer Vision," Proc. SPIE on Mobile Robots, Vol. 727, October 1986, which is incorporated herein by reference. Contour correlation and high order world models are the basic elements of that method, realized on a special multi-processor computer system. Perspective projection and dynamical models (Kalman filter) are used in an integrated approach for the design of the visual feedback control system. That system requires good lane markings and thus is limited to only those roads having good lane markings. It is of course desirable to extend the benefits of the computer vision system to roads with less good markings and to incorporate other features such as obstacle detection.

SUMMARY OF THE INVENTION

It is therefore an object of the invention to provide a computer vision method of lane boundary detection operable on roads having moderate markings and even with some markers missing. It is a further object to provide such a method with obstacle detection capability.

The invention is carried out in an automotive vehicle having a computer vision system and an associated camera for viewing the scene ahead of the vehicle, by a method of detecting lane markers on a roadway comprising the steps of: obtaining an image of the scene and digitizing the image, normalizing the image, defining a search area in the image, searching for lane markers in the search area of the image, estimating the position of any missing lane marker, and defining lane boundaries from the position of the lane markers.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
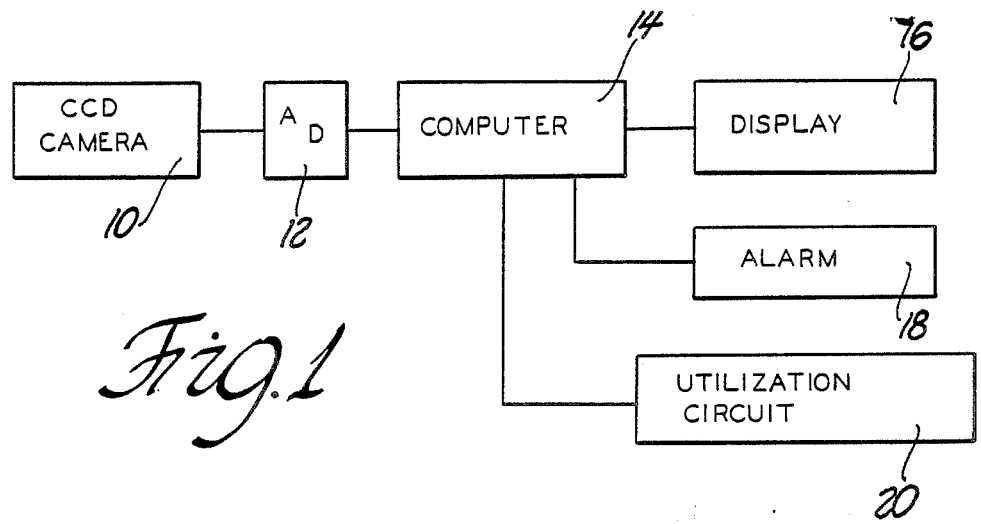
FIG. 1 is a block diagram of a computer vision system for carrying out the method of the invention.

As shown in FIG. 1, the hardware used to implement the method of the invention comprises a black and white CCD video camera 10 mounted in a vehicle, say at the upper center of the windshield to capture the driver's view of the road ahead, an analog-to-digital converter 12 for coupling the camera output to a computer 14, and output devices driven by the computer including a display 16, an obstacle warning alarm 18 and a utilization circuit 20 which may be any device using the lane boundary information for vehicle guidance, performance monitoring or headway control, for example.

The computer is programmed with algorithms for processing the images sensed by the camera. Two main algorithms for processing the image are disclosed herein. One uses a Hough transform and the other uses template matching. Both algorithms, however, dynamically define the search area for lane markers based on the lane boundaries of the previous frame, and provide estimates of the position of missing markers on the basis of current frame and previous frame information. Also in both cases preprocessing procedures detect obstacles in the lane within about 50 feet of the vehicle and give a warning via the alarm 18.

Figure 2:
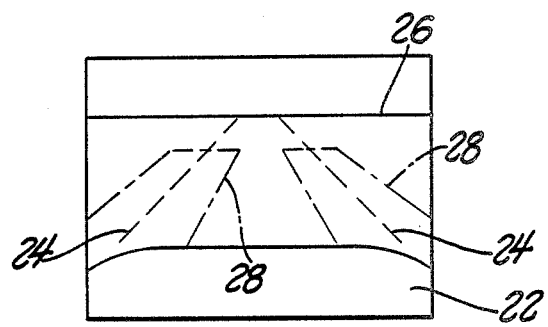
FIG. 2 is an illustration of a roadway scene in a camera image plane.

FIG. 2 is an example of a typical image as projected on the camera image plane and includes the vehicle hood 22 and broken or solid stripes or lane markers 24 painted on the road and terminating at the horizon 26. Since the image spaces above the horizon and below the hood line do not contain useful lane boundary information those regions are ignored by the image processing algorithms. A special calibration procedure enables range estimation, based on known characteristics of the road and the camera. It assumes flat roads with parallel markers at known look-ahead distances. The calibration determines the relationships between the positions of the actual markers and the images of these markers. This process defines a set of "reference markers" which are used as an initial set of lane boundaries seen by the vehicle when it is in the middle of the lane.The reference markers are also used when consistency of width is violated or when the two estimated lane boundaries cross each other.

Figure 3:
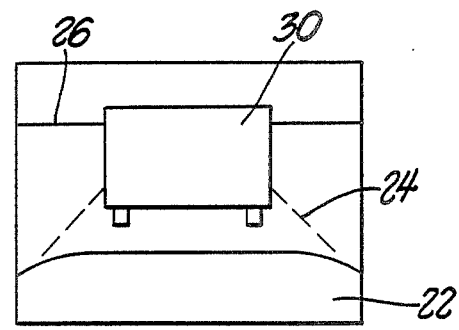
FIG. 3 is an illustration of a roadway scene in a camera image plane, the scene having an obstacle in the roadway, FIGS. 4a and 4b together comprise a flow chart of an embodiment of the method of the invention employing template matching.

The broken line boxes 28 around the markers 24 define the area to be searched for detecting markers and is determined by the position of the lane boundaries in the previous image frame. In reality many other objects are in the image such as trees, other vehicles, overpasses and signs. The defined search area helps eliminate much of them from the processed image as well as to minimize the processing time. FIG. 3 illustrates the presence of a vehicle 30 or other obstacle in the roadway of FIG. 2. If the other vehicle is close, say, within 50 feet of the trailing vehicle, it tends to obscure the lane markers 24 to such an extent that there is insufficient information to determine the boundaries. In that case an obstacle warning is given and no further image processing is done on that frame. When the obstacle 30 is more than 50 feet away the image is processed but the obstacle is effectively erased from the image by removing horizontal and vertical lines, thereby making the subsequent processing steps simpler.

The template matching algorithm is widely used in image recognition and computer vision applications. In this algorithm, a template or window of desired intensity and shape is correlated with the image to create a correlation matrix. The elements of this correlation matrix indicate the quality of the match between the template and the image at all locations, according to some metric. Here, the absolute difference metric is used as the correlation measure. Other types of measures such as normalized correlation can also be used. The matching can also be done in the image-edge domain obtained by filtering the raw image with a Sobel filter. The advantage of edge matching is its insensitivity to light variations; however, with this method, potholes, streaks, road texture and shadows may generate false objects. The template matching algorithm described below uses both image data and edge data.

Figure 4A:
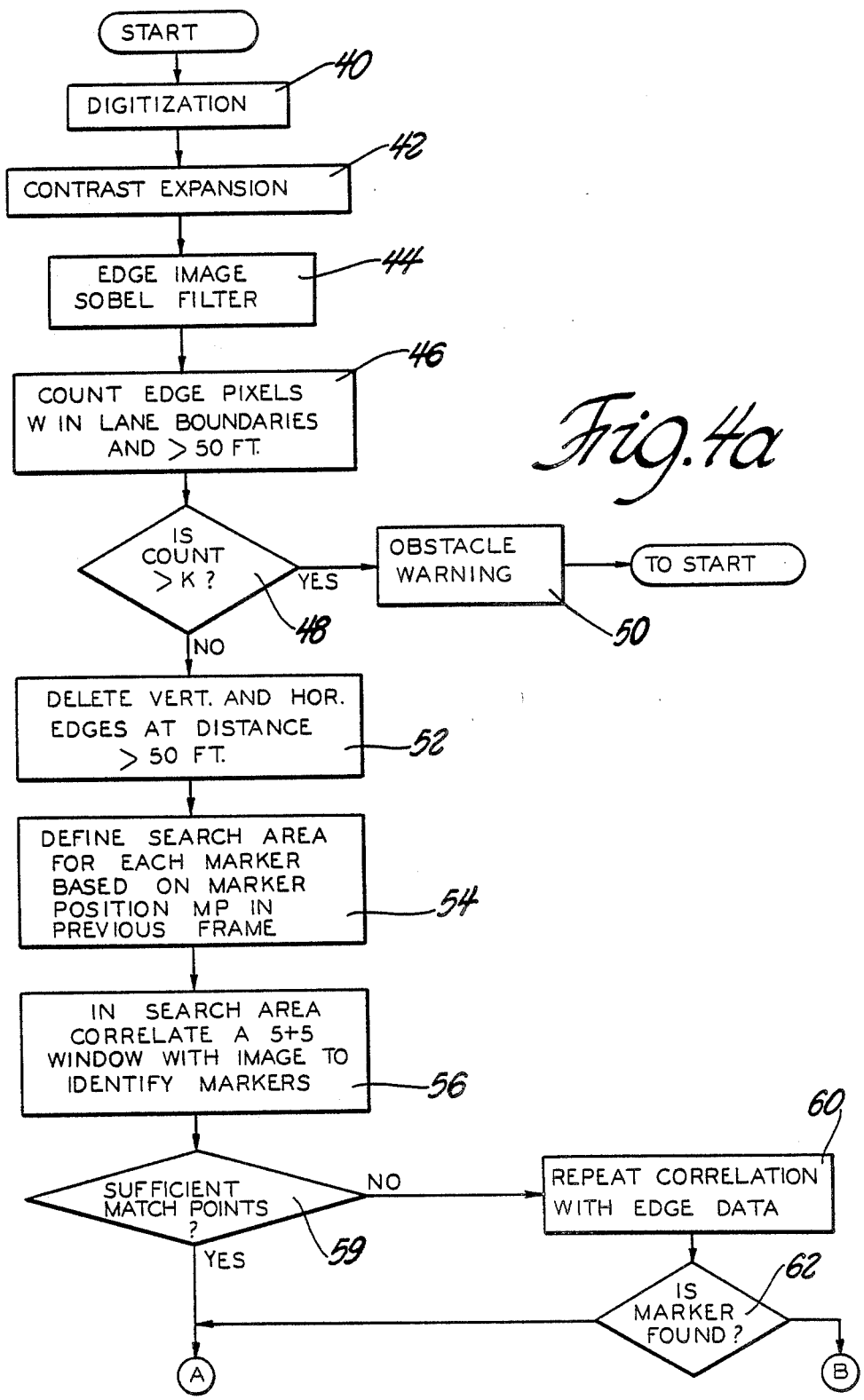
Figure 4B:
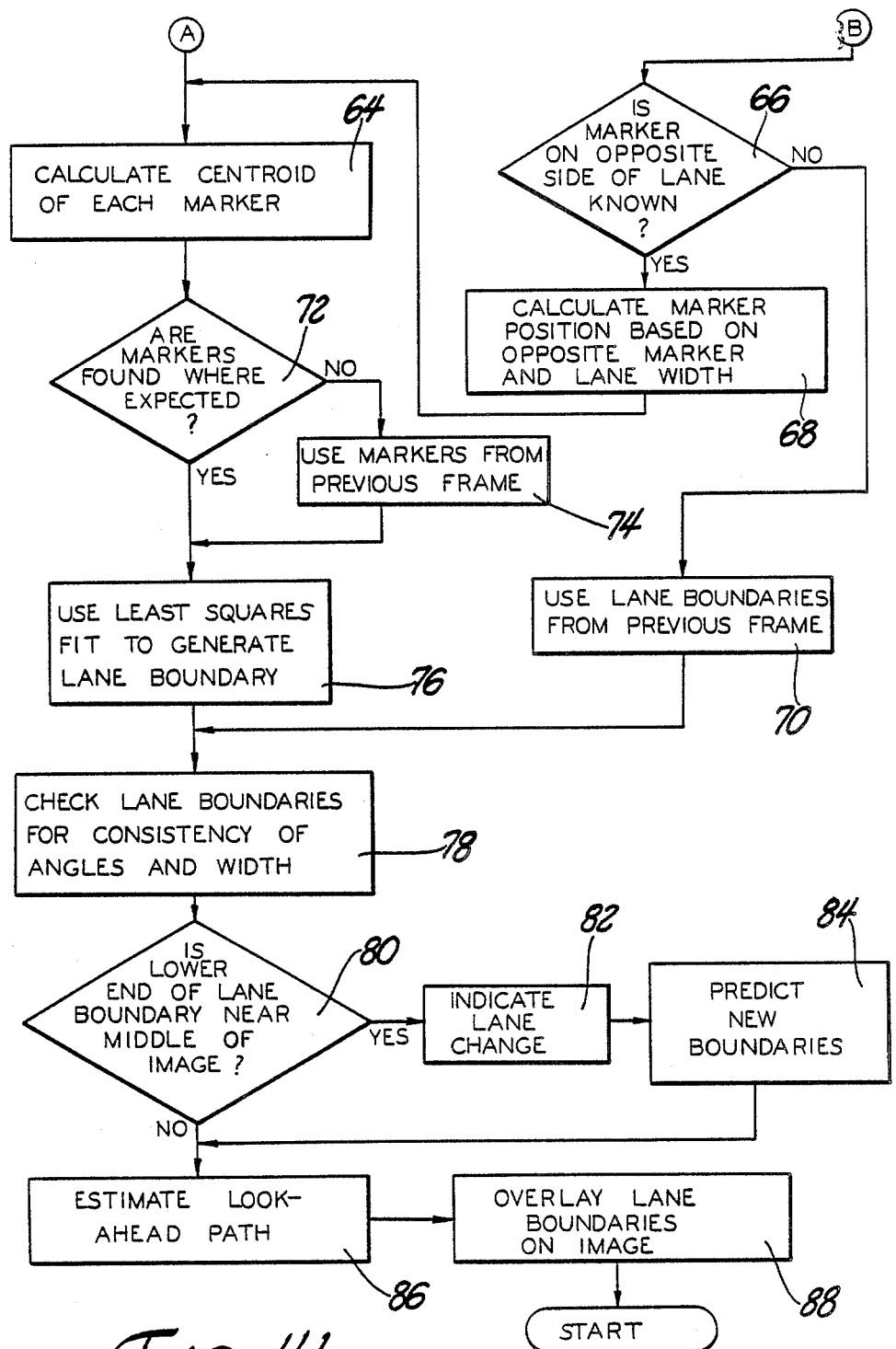

FIGS. 4a and 4c comprise a flow chart of an image processing method which uses a template matching algorithm. The figures are joined at nodes A and B. Numerals in the text marked by angle brackets < > refer to reference numerals on the flow chart boxes. The raw image is digitized <40> into a 512×512×8 image. The processing area is reduced in the vertical and horizontal directions. In the vertical direction, it is limited by the horizon line 26 and by the hood 22. These limits are obtained from the camera geometry and the calibration image. Then the gray level distribution of the processing area is contrast expanded or normalized <42> to have standard statistics (e.g., a gray level distribution with mean=100 and standard deviation=20; the gray level range is 0 to 255 with 0 being full black and 255 being full white). Next, a 3×3 Sobel filter is used <44> to generate edge data 124×512 pixels in size.

An obstacle in the lane ahead will give rise to strong edges in addition to those presented by the roadway. The presence of obstacles is detected by counting the number of strong edge points within the area defined by the lane boundaries of the previous frame <46> and comparing to a threshold <48> for a given look-ahead distance. For example, the number of pixels within 50 feet of the vehicle having a gray level greater than 150 are counted and compared to a threshold. If an obstacle is detected within 50 feet, then a warning to the driver is given <50> and the control returns back to the first step for a new frame. The location of lane boundaries is not updated since the presence of the obstacle obscures them. The obstacle distance is determined by the ground level obstacle image since the image plane calibration does not take into account the vertical height of an object. As seen in FIG. 3, the top of the vehicle 30 appears to be beyond the horizon as seen in the image plane although the vehicle 30 is actually close as is realistically shown near ground level. Thus for obstacle detection, only the bottom of the vehicle 30 image is scanned since it is in the near portion of the image plane.

Obstacles detected at distances greater than 50 feet (in the far field portion of the image) are effectively deleted from both the image and the edge data <52> to facilitate the execution of the following steps. For this purpose it is assumed that the obstacle has a high content of vertical and horizontal lines whereas the lane markers to be detected comprise diagonal lines. The obstacles are deleted from the image using the following criteria: lines to be deleted must be either vertical or horizontal, their length must exceed 40 pixels, and their intensity must exceed 150.

After the obstacle deletion step the search area is defined dynamically <54>. Given the previous lane boundaries, a truncated triangular search region is defined for each marker location such that the search region for the two sides of the lane do not overlap. Moreover, the search area changes with marker position MP, and increases in size if the marker was not found in the search of the previous frame. This limits the search space in which the markers can move from one frame to another and shortens the processing time.

Figure 5:
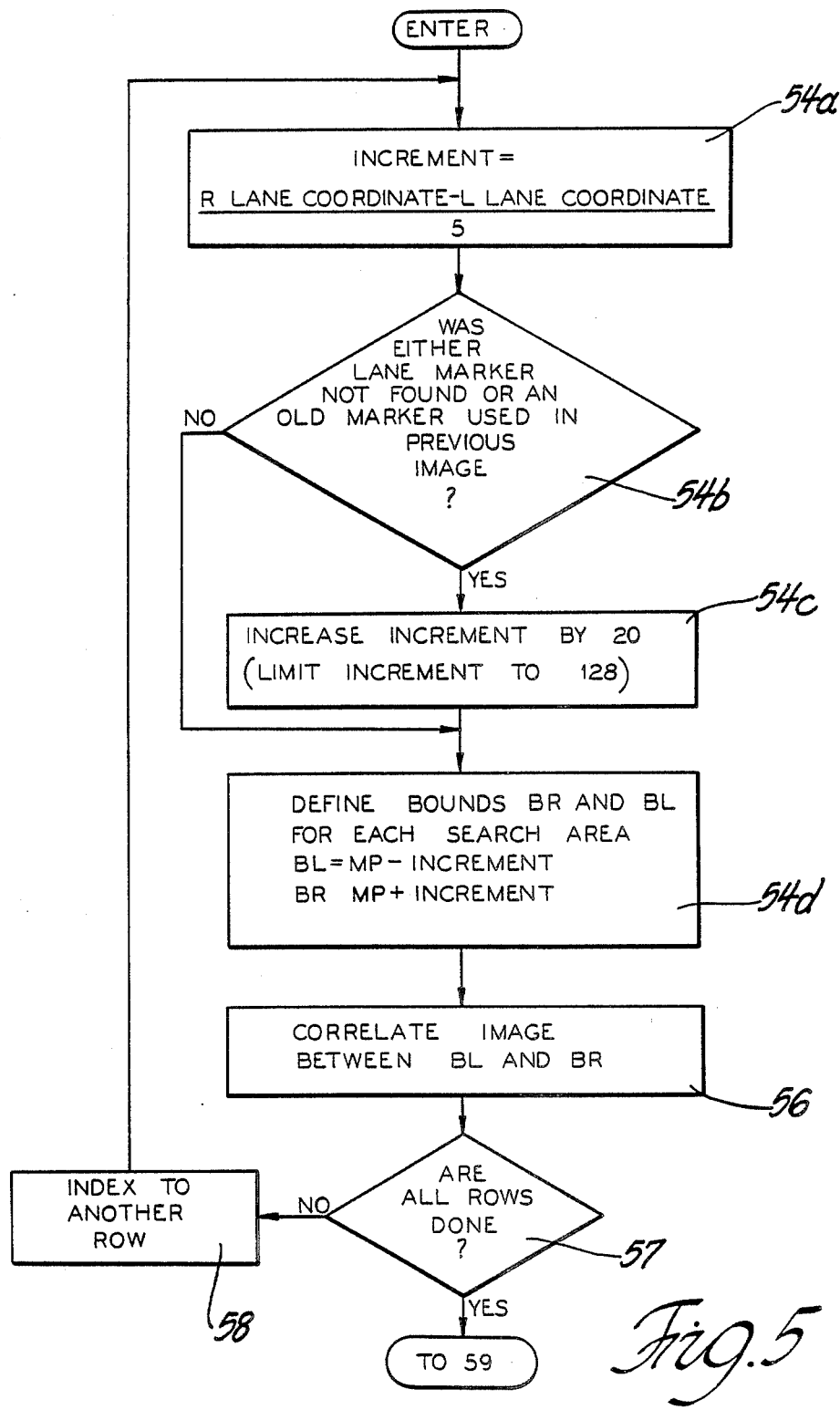
FIG. 5 is a flow chart of the dynamic search area definition method used in the FIG. 4 method.

The dynamic search method is shown separately in FIG. 5. The search is conducted one row at a time and the search field is selected for each row. It begins by defining an increment for a given row as one fifth of the distance between the right and left lane coordinates for that row <54a>. It is then decided <54b> whether either a lane marker was not found or an old marker was used in the previous image. If so, the increment is increased by 20 pixels to enlarge the search area <54c>. Then the right bound BR and the left bound BL (for each search area) is found <54d> by adding and subtracting the increment from the marker position MP for that line. Next a correlation procedure <56> is followed for the defined search field in the current line and if all the rows have not been processed <57> the search continues in another row <58> and the search field is redefined for that row.

When the search area is defined a template matching operation begins <56>. For the defined search area, a window of size 5×5 pixels with constant gray level of 240 is correlated with the image. The correlation measure is based on the absolute difference of the window's gray level and the image's gray level. The window is moved horizontally across the image pixel by pixel to obtain a correlation measure at every point in the traverse and is then indexed vertically to make another horizontal traverse. To reduce computations, the window may be indexed vertically by more than one line so that strips of the search area are sampled rather then the complete search area. Using the absolute difference metric, a perfect match will yield a zero element in the correlation matrix. The correlation matrix is therefore searched for its minimum values. Elements with values under some threshold are selected to represent the marker positions.

This correlation procedure will not yield any match for yellow or faded white lane markers. If such markers are present or markers are missing altogether, there will be only a few match points. The match points are counted <59> and if there are too few, say, 6 points out of a possible 100, the correlation is repeated with the edge data <60>. Then if the marker is found <62> or there were sufficient match points <59>, the centroid of each marker is calculated <64>. If the marker is not found <62> and the marker position on the opposite side of the lane is known <66>, the missing marker position is calculated based on the opposite marker position and the lane width <68> and its centroid is calculated <64>. When the marker position on the opposite side of the lane is not known <66> the lane boundary from the previous frame is used <70>. After the centroid of each marker is calculated <64>, if the markers are not found where expected <72> based on the previously detected lane geometry, the marker locations from the previous frame are used <74>.

The determination of expected marker position <72> involves comparing the position of each marker centroid with that of the previous frame. If the change is more than nine pixels a flag is set. Then a check is made for the presence of a second marker in each search area as may occur, for example, when an exit lane is sensed. The distance between two such markers is computed and if it is above a threshold for some distance (15 rows of the image) the outside marker (i.e., the rightmost marker in the right search area) is rejected and a flag is set. Then for each row, if a marker is not found the previous marker is used, provided no flag has been set. If a flag is set, only new marker locations are used. The result of this procedure is a set of x,y coordinates specifying lane markers. Then a least-squares line fit is performed to generate the lane boundary <76>.

To validate the estimated lane boundaries they are checked for consistency of angles and width <78>. If the angle between the present lane boundary and the previous lane boundary is greater than 35°, then the present lane boundary is rejected. It is then estimated from the other lane boundary based on lane width. Similarly, the width of the lane is checked at two different look-ahead distances for upper and lower bounds.

The algorithm also checks for lane changes by determining if the lower end of a lane boundary is near the middle of the image <80>. If it is a lane change, warning is given <82> and depending on the lane change direction (left or right), the markers are exchanged, i.e., for a left lane change, the left boundary is redefined as the right boundary and a new left boundary is predicted based on the road/camera geometry.

The estimated lane boundaries are used to compute the vanishing point (where the left and right boundaries intersect) and the intersection of the right marker at a fixed distance. These points and the vehicle dynamics information are then used by a Kalman filter for estimating the road curvature, the lateral shift from the center of the lane, and the heading error as disclosed in the Dickmanns et al paper, supra. These estimates determine a coordinate transformation which determines the look-ahead path required for autonomous vehicle control <86>. For display purposes the lane boundaries are overlaid on the image <88>.

Figure 6A:
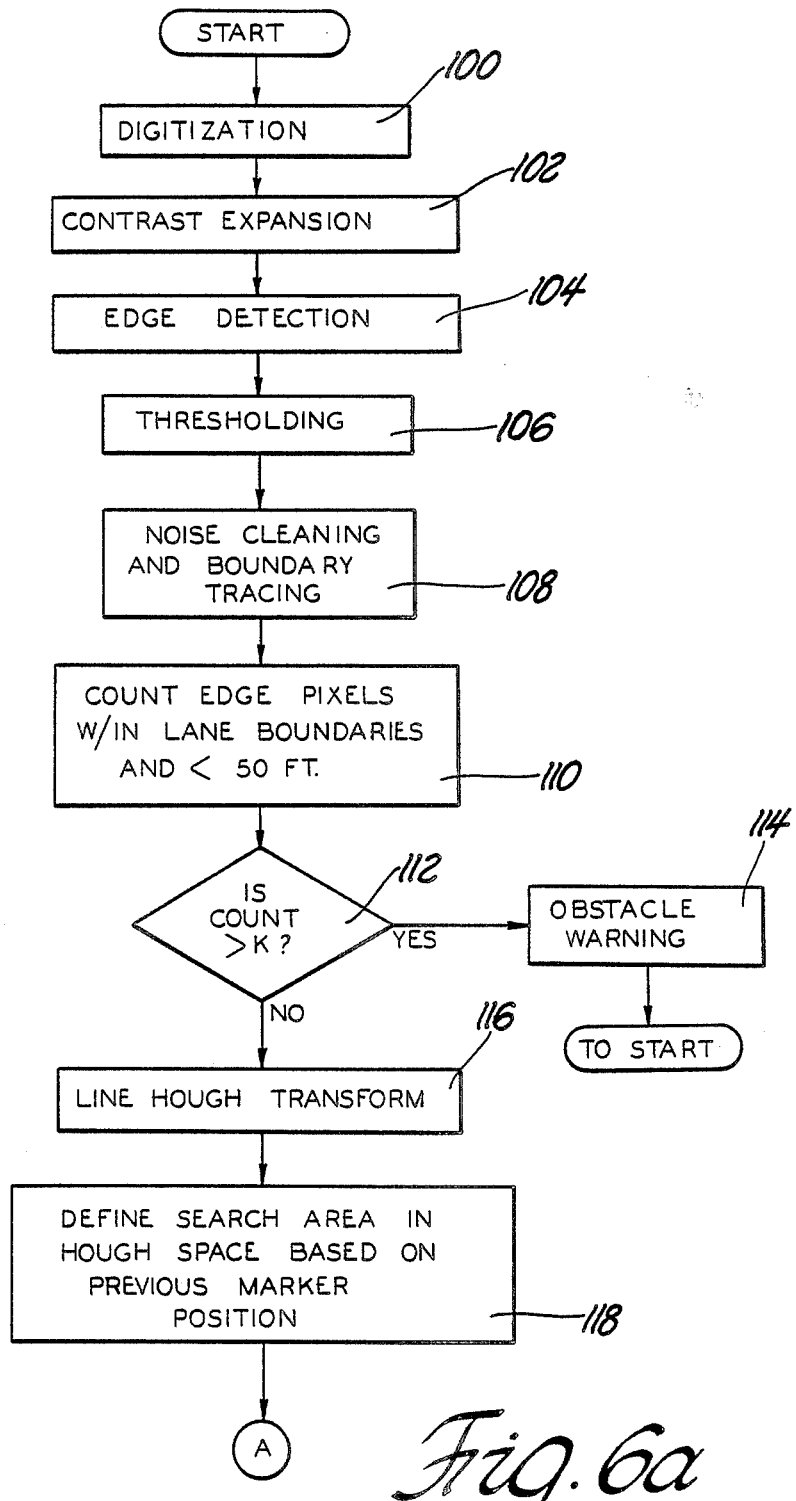
FIGS. 6a and 6b together comprise a flow chart of another embodiment of the method of the invention employing a Hough transform.
Figure 6B:
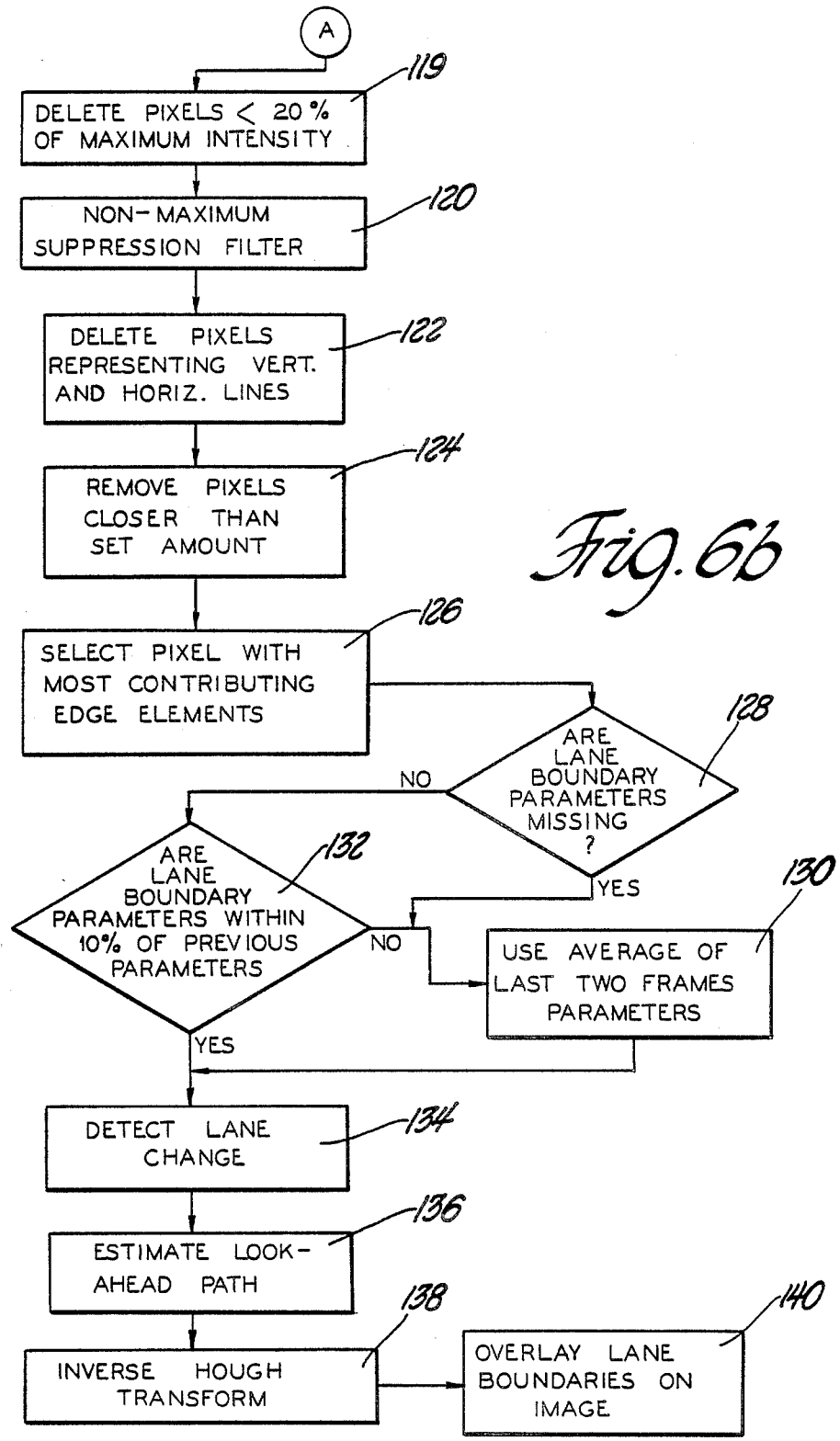

FIGS. 6a and 6b comprise a flow chart showing an image processing algorithm using a Hough transform. The two figures are joined at node A. The process starts by digitization of the camera signals <100>, contrast expansion <102> and edge detection by a Sobel filter <104> as described for the previous method. The image area between the vehicle hood and the horizon is the only area operated upon. A thresholding operation <106> generates a binary image by setting all gray levels above 150 to one and the rest to zero. Noise cleaning and boundary tracing <108> removes isolated, single pixels and traces the boundaries of the lane and road markers. The boundary tracing algorithm saves connected or adjacent pixels and follows the contour of a lane marker or a road edge in all directions. This is done by dividing the image into three equal segments representing the left, center and right portions of the image. For each segment, the left and right edges of the lane or road markers are searched for at least two adjacent edge pixels. After marking the edge pixels, the boundaries of the lane markers are traced until either the top of the image is reached or until no edge pixels are found. The resulting boundary traced image has clean lane markers and road edges. Then obstacle detection is performed by counting edge pixels within the lane boundaries and within 50 feet of the vehicle <110> and comparing the count to a threshold <112>. If the count is greater than the threshold an obstacle is detected and an obstacle warning is given to the driver <114> and the program returns to START. If no obstacle is detected a line Hough transform is performed <116>.

Figure 7A:
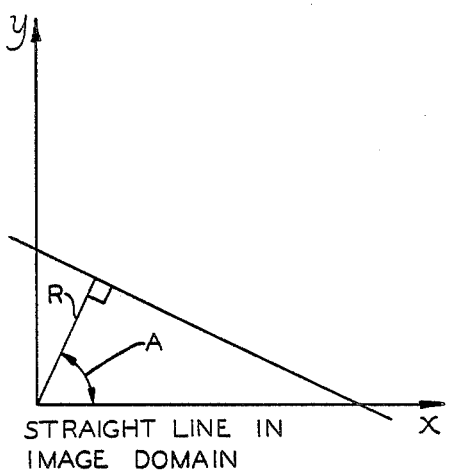
FIGS. 7a and 7b are an image plane view of a line and a Hough space representation of the same line, respectively.
Figure 7B:
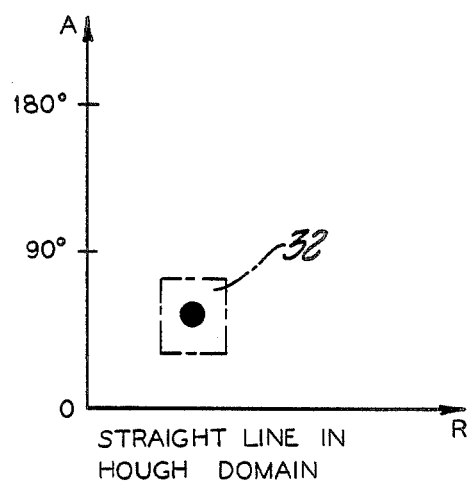

The Hough algorithm uses the boundary traced lane markers to estimate the location of the lane boundaries. The Hough transform has been used extensively for image processing applications. By knowing the desired shape a priori, the transform maps complex shapes, whether lines or curves, into simple ones in the Hough domain. The simplest transform in terms of computational burden is a line transform. Accordingly the lane boundaries are approximated by several straight lines. FIGS. 7a and 7b show a line in the image plane and the Hough transform of the same line. The normal parameterization of a straight line is given by $R = x \cos A + y \sin A$ where R is the shortest distance from the origin to the line, and A is the angle between the normal to the line and the x axis. Each pixel in the Hough domain represents a potential line in the image space. After a line Hough transform is performed on the boundary traced image <116> a search area is defined around the previous boundary position <118> in Hough space as indicated by the box 32 in FIG. 7b.

The intensity of each pixel in the Hough domain corresponds to the strength of a line in the image space or the number of edge elements contributing to that line. To select the n strongest lines in the image, one needs to identify the n pixels with the highest intensity in the Hough domain. The following criteria are used to select the correct lines: (a) the intensity of the selected pixels should have local maxima, (b) the separation of the selected pixels should exceed a certain threshold, and (c) the intensity of the selected pixels should exceed 20% of the maximum intensity. The selection algorithm is implemented by identifying the maximum pixel intensity and deleting those that are less than 20% of that maximum intensity <119>. Then the Hough domain is filtered with an $11 \times 11$ non-maximum suppression filter <120>, i.e., for a given pixel, if the other 120 pixels around it were higher in intensity, then the intensity of the subject pixel is set to zero. After filtering, only one local maximum pixel for each $11 \times 11$ neighborhood could survive in the Hough domain but some points can still be close together. The number of Hough pixels is further reduced by deleting pixels which would generate near horizontal or vertical lines (A=0°, A=90°, A=180°) <122>. Additional pixels are removed if the distance between two pixels is less than 34 <124>. Finally the pixels are sorted based on intensity or the number of contributing edge elements and the top four pixels are chosen <126>.

In a typical application, the roadway may include discernible lane markers defining two lanes, and road edges may also be visible even if not painted. In this case four edges will be searched for to define the road and the vehicle relationship to the road. When the Hough transform is performed about 300 points may be present in Hough space which represent minor edges, major edges including the ones of interest, and noise. Each operation reduces the number of remaining edges. For example, the deletion of those less than 20% of maximum intensity may eliminate all but 50 points. The non-maximum filter may leave 10 points, and the deletion of pairs that are close together and of those representing horizontal and vertical lines may remove a few more points. Finally the strongest four pixels of the remainder are selected as the lane markers and road edges.

These pixels represent the lane boundaries. The pixels are checked to determine if any lane boundary parameters are missing <128>. If they are, the average of the last two frames parameters are used If the parameters are not missing they are validated by comparison with parameters of previous frames <132> and if they are within 10% they are considered to be valid. If not, the average parameters of the last two frames is used <130>. Then lane change is detected <134> and the look-ahead path is estimated <136> using the Kalman filter as described for the previous method, and an inverse Hough transform generates lane boundaries <138> in the image space which are overlaid on the image for display purposes <140>.

The Hough domain is quantized to a 256×256 space for this implementation. Since pixels are selected based on a distance of 34, it is evident that the quantized space can easily be reduced to 128×256 for decreasing the processing time. For real time applications, systolic array chips could be used for fast calculations of the Hough transform. The image could be divided into several sub-images with several systolic chips working in parallel, mapping the results into several Hough domains. Since the Hough transform operation is linear for the continuous case, the final transform can be obtained by summing the partial Hough results. Another advantage of the transform is that a priori knowledge about lane and road boundaries can easily be embedded in the algorithm.

The method of the invention performed by either algorithm, template matching or Hough transform, has several advantages:

(a) The method works well with missing and discontinuous markers, both yellow and white.

(b) The search area in both algorithms is defined dynamically and adapts to the location of the lane markers, which saves processing time.

(c) This method estimates road boundaries with low radius of curvature (e.g., entrance and exit highway ramps).

(d) This method detects lane changes and warns the driver when lanes are crossed.

(e) This method can detect certain obstacles in the lane.

The description of a preferred embodiment of the invention for the purpose of illustrating the invention is not to be considered as limiting the invention since many modifications may be made by the exercise of skill in the art without departing from the scope of the invention.

The embodiments of the invention in which an exclusive property or privilege is claimed are defined as follows:

1. In an automotive vehicle having a computer vision system and an associated camera for viewing a scene ahead of the vehicle, a method of detecting lane markers on a roadway comprising the steps of:
    obtaining an image of the scene and digitizing the image,
    normalizing the image,
    defining a search area in the image,
    searching for lane markers in the search area of the image to locate lane marker positions,
    estimating the position of any missing lane marker from said located lane marker positions, and
    defining lane boundaries from the said located lane marker positions and the estimated position of the missing lane marker.

2. The invention as defined in claim 1 wherein the step of estimating the position of missing lane markers comprises averaging the corresponding marker positions from previous images.

3. In an automotive vehicle having a computer vision system and an associated camera for viewing a scene ahead of the vehicle and obtaining a series of images of the scene, a method of locating lane boundaries on a roadway comprising for each image the steps of:
    digitizing the image and normalizing the image,
    dynamically defining a search area in the image based on the lane boundaries located in a previous image,
    searching for lane markers in the search area of the image to locate lane marker positions,
    estimating the position of any missing lane marker based on information selected from the current image and previous images, and
    defining lane boundaries from the said located lane marker positions and the estimated position of the missing lane marker.

4. The invention as defined in claim 3 wherein the step of estimating the position of missing lane markers comprises the steps of:
    determining the lane width from said previous image, and
    calculating the estimated position of a missing lane marker from the position of a marker on the opposite side of the lane and the lane width.

5. The invention as defined in claim 2 including the steps of:
    checking the validity of a current lane boundary position by comparing a current lane boundary angle and lane width with that of the previous image wherein a discrepancy of said current lane boundary angle or said current lane width greater than threshold values reveals an invalid boundary, and
    when said current lane boundary position is invalid, substituting a preceding boundary position.

6. The invention as defined in claim 2 wherein the step of searching for lane markers comprises the steps of:
    generating edge data from the image, correlating a template with the image in the search area, and if insufficient match points are found to define a marker then correlating said template with the edge data in the search area.

7. The invention as defined in claim 2 wherein the steps of defining a search area and searching for lane markers comprise the steps of:

generating edge data from the image, performing a boundary tracing operation on the edge data to generate a boundary traced image, performing a line Hough transform on the boundary traced image to yield pixels in Hough space, defining a search area in Hough space based on lane boundaries defined in a previous frame, and searching for lane markers in Hough space to locate said lane marker positions.

8. The invention as defined in claim 7 wherein the step of search for lane markers in Hough space comprises the steps of:

reducing the number of said pixels in Hough space by filtering said pixels in Hough space with a non-maximum suppression filter, deleting pixels in Hough space representing vertical and horizontal lines, removing pixels in Hough space closer than a set amount, and selecting pixels in Hough space with the most contributing edge elements as said lane markers.

9. In an automotive vehicle having a computer vision system and an associated camera for viewing a scene ahead of the vehicle and obtaining a series of images of the scene, a method of locating lane boundaries and close obstacles on a roadway comprising for each image the steps of:

digitizing the image and normalizing the image, generating edge data from the image, determining an edge pixel count by counting edge pixels between lane boundaries defined in the previous image ad in the image portion representing space close to the vehicle, comparing the edge pixel count to a threshold value and issuing an obstacle warning when the count is above the threshold value, when the edge pixel count is below the threshold value, dynamically defining a search area in the image based on the lane boundaries located in said previous image, searching for lane markers in the search area of the image to locate lane marker positions, estimating the position of any missing lane marker based on information selected from the current image and previous images, and defining lane boundaries from the said located lane marker positions and the estimated position of the missing lane marker.

10. The invention as defined in claim 9 including the step of:

before searching for said lane markers, effectively deleting obstacles from far field portions of the image by removing vertical and horizontal lines within the said search area in the image.

* * * * *